(12) United States Patent
Gorman

(10) Patent No.: US 6,702,553 B1
(45) Date of Patent: Mar. 9, 2004

(54) ABRADABLE MATERIAL FOR CLEARANCE CONTROL

(75) Inventor: Mark D. Gorman, West Chester, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/263,870

(22) Filed: Oct. 3, 2002

(51) Int. Cl.$^7$ .................. B32B 15/04; B32B 15/20; B32B 15/18; F16J 15/00

(52) U.S. Cl. .................. 416/241 R; 416/177; 416/224; 428/472.2; 277/423; 277/652; 277/650; 277/345

(58) Field of Search .................. 428/613, 601, 428/632, 650, 651, 652, 654, 678, 680, 681, 687, 332, 472.2, 702, 539.5, 409, 34.4, 34.6; 277/303, 423, 652, 650, 345; 416/177, 248, 223 R, 224, 241 R, 241 B; 415/174.5, 200, 173.5, 230, 173.4, 173.3

(56) References Cited

U.S. PATENT DOCUMENTS

| | | |
|---|---|---|
| 4,481,237 A | 11/1984 | Bosshart et al. |
| 4,503,093 A | 3/1985 | Iseli et al. |
| 4,676,994 A | 6/1987 | Demaray |
| 4,744,725 A | 5/1988 | Matarese et al. |
| 4,867,639 A | 9/1989 | Strangman |
| 4,880,614 A | 11/1989 | Strangman et al. |
| 4,914,794 A | 4/1990 | Strangman |
| 5,059,095 A | 10/1991 | Kushner et al. |
| 5,214,011 A | 5/1993 | Breslin |
| 5,304,032 A | 4/1994 | Bosna et al. |
| 5,439,348 A | 8/1995 | Hughes et al. |
| 5,536,022 A | 7/1996 | Sileo et al. |
| 5,728,638 A | 3/1998 | Strange et al. |
| 5,962,076 A | 10/1999 | Mason et al. |
| 6,102,656 A | 8/2000 | Nissley et al. |
| 6,103,386 A | 8/2000 | Raybould et al. |
| 6,233,822 B1 | 5/2001 | Grossklaus, Jr. et al. |
| 6,428,280 B1 * | 8/2002 | Austin et al. ........... 416/241 B |
| 6,435,824 B1 * | 8/2002 | Schell et al. ............. 415/174.4 |
| 6,521,053 B1 * | 2/2003 | Grylls et al. ................ 148/280 |
| 6,582,812 B1 * | 6/2003 | Grylls et al. ............. 428/307.7 |

FOREIGN PATENT DOCUMENTS

EP 0484115 A1 5/1992

* cited by examiner

Primary Examiner—Michael LaVilla
(74) Attorney, Agent, or Firm—Jonathan P. Miller; Carmen Santa Maria; McNees Wallace & Nurick LLC

(57) ABSTRACT

A highly porous alumina material and a method for applying such material that is useful in the hot section of a jet aircraft engine. In order to manufacture the porous alumina, an aluminum-based metal/alumina material known in the art is first placed onto a metal alloy substrate. The aluminum-based metal is then dissolved using a solution that will not affect the alumina or the underlying substrate. The alumina is then washed with deionized water and dried. The resulting alumina has a porosity in the range of about 20% to about 45%. The alumina has globular interconnected surface features in the range of about 0.5 $\mu$m to about 20 $\mu$m.

4 Claims, 2 Drawing Sheets

ABRADABLE MATERIAL FOR CLEARANCE CONTROL

CROSS-REFERENCE TO RELATED APPLICATIONS

This Application is related to application Ser. No. 10/264,052, filed contemporaneously with this Application on Oct. 3, 2002, invented by Mark. D. Gorman, entitled "APPLICATION METHOD FOR ABRADABLE MATERIAL", assigned to General Electric Company, the assignee of the present invention, and which is incorporated by reference herein.

FIELD OF THE INVENTION

The present invention is directed to an abradable alumina material for clearance control in the stator rub portion of gas turbine engines.

BACKGROUND OF THE INVENTION

Modern aircraft are often powered by a propulsion system that includes a gas turbine engine housed within an aerodynamic streamlined nacelle. The major portions of an engine include a fan, compressor, combustor and turbine section. In the turbine portion of the engine, there are static parts and rotating parts. The static boundary at the tip of the rotating parts or blades are referred to as shrouds.

One of the most demanding materials applications in current technology is found in turbine components used in jet aircraft engines, which require high strength materials to operate in corrosive, oxidative environments at high operating temperatures. The higher the operating temperature of an engine, the greater its efficiency, and the more power it can produce from each gallon of fuel. There is therefore an incentive to operate such engines at as high a temperature as possible.

There has been an extraordinary amount of effort over the past 45 years to develop materials that can be used in high temperature engine applications. The compositions of such materials are carefully designed to maintain their desirable properties during use at the high temperature of engine operations. The high pressure turbine shroud sections are comprised of materials that are tolerant to these high temperatures, which are in the neighborhood of 2000° F. to 2200° F., since such materials form a boundary for the flow of the hot gases of combustion.

Since the turbine shrouds are located within the turbine regions of the engine radially outboard and immediately adjacent of the blades, the turbine blades can rub against the shrouds. This rubbing wears away the interfering materials, the less abrasive material of the two experiencing greater wear, whether such material is part of the turbine blade or the opposed turbine shroud during high temperature operation and power excursions.

Shrouds that are subject to rubs from blade tips are made from various materials. These shrouds may be made with coatings or may be uncoated. The shrouds can damage the blade tips if they are higher strength than the opposed turbine blade, and can cause excessive wear if the shroud surface is too abrasive. Frequently, the shrouds have poor environmental resistance due to processing steps taken to control initial geometric tolerances and clearances near the blade tips, as the tolerance between the blade tips and the shroud is desirably kept to a minimum in order to minimize the leakage of gas through the clearance between the blade tips and shroud. Blade replacement or repair is significantly more expensive and difficult than replacing the shroud, so it is desirable to provide a system which preferentially abrades the shroud rather than the blade tips. Finding a suitable compromise between blade life and shroud life has been difficult, particularly in engine hot section application.

The high pressure turbine shroud, and the high pressure turbine blade form the portion of the flowpath where gas stream energy is converted to mechanical energy used to sustain engine operation. The high pressure turbine shroud includes a region known as the shroud or stator rub area, because it is in this section of the shroud where the turbine blades typically contact the shroud. If the stator or shroud rub area does not fit tightly to the blade tip, gas can escape in the gap between the shroud and blade tip without imparting its energy with the rotor. Such a poor fit creates a loss of engine efficiency.

Previously, the problem of how to seal the stator or shroud rub areas and the blade tips have been addressed in a number of different ways. Bare shrouds have been used. These bare shrouds typically have been comprised of expensive high strength superalloys. These alloys alone, while engineered to survive in a hot turbine, have insufficient environmental protection to prevent severe environmental attack for long term service in the turbine portion of a gas turbine engine. In addition, because of their strength, they can cause blade damage.

Shrouds may be manufactured with environmental coatings. However, these coatings can cause blade wear, complicate subsequent repair, and interfere with establishing the desired tight initial dimensional tolerance. Finally, blades may be manufactured with abrasive tips, however such blades are difficult to produce and provide only temporary protection. Such blade tips have a very short life at operating temperatures. The rub area of the shroud is generally abraded to a greater extent than the expected reach of the blades because of the natural thermal expansion of the blades relative to the stator due to high temperature operation, unbalance loads, and large maneuver loads, particularly during take-off and landing. Thus, at lower operating temperatures, such as those experienced at cruise speed, the rubbed area can result in a larger gap between the blades and the shroud.

Ceramic coatings are applied as thermal insulation for metal superalloy parts. These ceramic coatings, when used in combination with an environmental coating, protect the substrate alloy from rapid oxidation and corrosion caused by the flow of hot engine gases over the alloy. In the past, ceramic coatings, such as $ZrO_2$ and aluminum oxide ($Al_2O_3$), otherwise known as alumina, have been applied to stator rub areas of the shroud using a thermal spray process. However, the processes used to deposit the ceramics have produced a dense layer that is not very porous. Such a dense layer is extremely abrasive and has a tendency to wear away the turbine blade tips that come into contact with it.

Recent developments in the field of surface treatments to metal and intermetallic substrates have led to the development of a new type of metal/metal oxide wear material. The various forms of this wear material are capable of withstanding a variety of high temperature erosive and corrosive environments. In one of these types of wear materials, the composition is a blend of aluminum and alumina ($Al_2O_3$).

However, the aluminum/alumina wear material does not have the physical and chemical properties that would lend the aluminum/alumina wear material to be an effective wear material for stator wear areas. The aluminum/alumina material is rather abrasive and is not an effective thermal barrier coating, since the metal phase has high thermal conductivity. In addition, the metallic component of the material would melt as the operating temperature of the engine is approached, the melting temperature of aluminum being about 1220° F.

Because of the problems with existing aluminum/alumina wear materials, and difficulties with ceramic densities deposited with existing thermal spray processes, there is a continuing need for further improvements to stator rub materials. The present invention fulfils this need and further provides related advantages.

SUMMARY OF THE INVENTION

The present invention provides a porous alumina rub material that initially is applied as a prior art aluminum/alumina (or an aluminum alloy/alumina) wear coating that can be applied to various metallic substrates, including the superalloys used for jet aircraft engine turbine stator or shroud assemblies. A substrate is required because the alumina without the aluminum has insufficient mechanical capability to be used for any purpose other than as a wear material coating. In addition to pure aluminum, the metal phase in the aluminum/alumina wear coating may include metals such as zinc, silicon, copper, iron, nickel, cobalt, magnesium, titanium, tantalum, tungsten, yttrium, niobium, zirconium, and hafnium to aid in the leaching of the aluminum. The modified aluminum/alumina material results in a shroud coating with improved abradability, which can function as a thermal barrier material.

Accordingly, the invention provides an abradable porous alumina coating for application for structures like high-temperature shroud areas that require materials having both high abradability and thermal resistance. While such shrouds are a particularly good application for the present invention, shrouds are not the only application for the present invention. The prior art aluminum/alumina wear material is applied to a predetermined thickness to the surface of a turbine shroud that will be exposed to the hot gases of combustion of a turbine engine. The aluminum/alumina wear material has a structure that provides an interwoven interdispersed phases of aluminum and alumina, wherein each of the phases is also substantially continuous. Generally, the aluminum/alumina wear material is an abrasive material.

Since the prior art aluminum/alumina wear material is unsuitable for use in turbine shroud rub areas, as it is abrasive, the metallic phase comprising aluminum (or aluminum alloy) must be removed from the alumina leaving a porous alumina, the porosity caused by displacement of the metallic phase. The aluminum is removed by washing the aluminum/alumina wear material with a solution that will dissolve or leach the aluminum, yet not substantially affect the alumina or the underlying substrate. The aluminum phase may be an alloy that contains zinc, copper, silicon, iron, nickel, cobalt, magnesium, titanium, tantalum, tungsten, yttrium, niobium, zirconium, or hafnium in order to increase the rate of leaching. Such leaching solutions include sodium hydroxide and nitric acid, but may include any suitable solution that effectively dissolves the metallic phase without affecting the alumina portion of the structure or the substrate material.

After removal of the aluminum with a suitable treatment, the coated shroud is treated with a suitable treatment to remove or neutralize any remaining solution.

An advantage of the present invention is that an alumina coating, which is highly porous, can be applied to a superalloy substrate.

A further advantage of the present invention is that it is light in weight, resulting in weight reduction as compared to conventional abradable ceramic coatings.

Another advantage of the present invention is that it provides excellent thermal protection to the underlying substrate alloy, the porosity contributing to thermal resistance.

Another advantage of the coating material of the present invention is that film cooling or transpiration cooling can effectively be applied to it because of its porosity, if desired.

Still another advantage of the present invention is that it may be applied over an environmental coating, such as diffusion aluminide or an MCrAlY alloy, applied to the shroud. When applied to a sufficient thickness, the coating of the present invention will be abraded by the rotating turbine tips in the rub area and yet will leave the underlying stator material protected by the environmental coating.

A further benefit of he present invention is that the coating of the present invention, while continuous, is sufficiently porous so as to be reduced in strength whereby the blades will abrade the coating with little or no effect on the blade tip.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
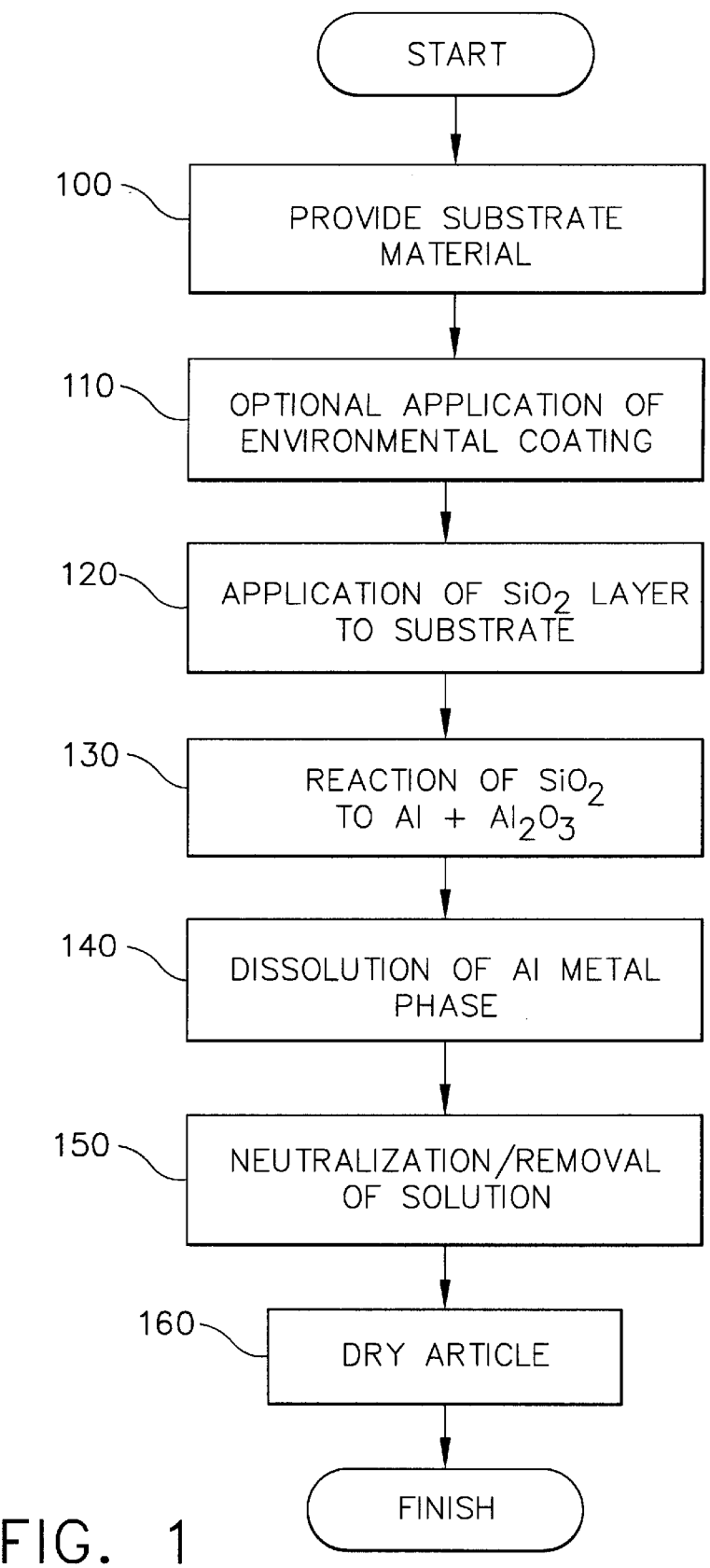
FIG. 1 is a process step illustrating the manufacture of the alumina material of the present invention.

Referring now to FIG. 1 there is shown a process for manufacturing a turbine shroud having the porous alumina coating of this invention. The initial step of the process 100 is the provision of a substrate material. The optional next step of the process is the application of an environmental coating to the substrate material 110. The next step of the process is the application of a sacrificial ceramic layer to the substrate material, wherein the sacrificial ceramic layer is selected from the group consisting of silica, quartz, mullite, silicate glass, fluorosilicate glass, fluoroborosilicate glass, aluminosilicate glass, fluorosilicate glass, calcium silicate glass, calcium aluminum silicate glass, calcium aluminum fluorosilicate glass, and combinations thereof. In a preferred embodiment, the sacrificial ceramic layer is silica ($SiO_2$) 120 as set forth in U.S. Pat. Nos. 5,214,011 and 5,728,638, which are incorporated herein by reference. In another preferred embodiment, the sacrificial ceramic layer is polycrystalline silica. In another preferred embodiment, the sacrificial ceramic layer is amorphous silica. The next step of the process is the application of a composite layer comprising aluminum and alumina on the substrate material by reacting the sacrificial ceramic layer with molten aluminum or a molten metal alloy comprising aluminum, that is, an aluminum-based metal, whereby a composite layer comprising alumina and aluminum is formed, whereby the sacrificial ceramic layer at least partially oxidizes the aluminum to form an alumina ceramic component of the aluminum/alumina layer, and wherein molten aluminum flows into alumina ceramic component, and wherein the sacrificial ceramic layer is at least partially reduced, whereby an aluminum/alumina composite layer is produced, possessing a near net shape of the sacrificial ceramic layer. The molten aluminum or molten aluminum alloy is at least 300° C. above its melting point, but below the softening point of the sacrificial ceramic layer. In a preferred embodiment, an SiO$_2$ precursor reacts with molten aluminum-based metal to form an alumina/metal composite layer 130 as set forth in U.S. Pat. Nos. 5,214,011 and 5,728,638. In a preferred embodiment, a characteristic of the aluminum/alumina composite is that the aluminum matrix and alumina matrix are both substantially continuous, yet interlocked, so that no substantial amount of aluminum is entrapped within the alumina as the aluminum is removed from the structure. The aluminum/alumina composite material is about 20 percent to about 45 percent metallic aluminum, with the balance being alumina. In a preferred embodiment, the aluminum/alumina composite material is about 30 percent to about 40 percent metallic aluminum, with the balance being alumina. The fourth step of the process is the washing of the aluminum/alumina layer in a leaching solution which dissolves the aluminum, without substantially affecting the substrate or alumina, leaving only a substantially continuous porous layer of alumina behind 140. The optional fifth step is washing the alumina in a neutralizing solution in order to remove any containments or leaching solution remaining in the alumina from the dissolution step followed by washing the article with deionized water to remove any neutralizing solution or leaching solution remaining on the coated substrate 150. If the leaching solution used is an acid, then a basic solution should be used to neutralize the leaching solution. If the leaching solution used is a base, then an acidic solution should be used to neutralize the leaching solution. The optional sixth step is drying the alumina in order to remove any deionized water left within the alumina 160. The result of this process is a highly porous alumina that is useful as a stator rub material.

The alumina that is the product of this process has a number of characteristics that are very desirable for use in stator rub areas. First, the alumina of the present invention is very porous, in the range of about 20 percent porosity to about 45 percent porosity. The features of the alumina are globular and includes porosity in the range of about 0.5 microns to about 20 microns. In a preferred embodiment, the alumina has a porosity in the range of about 30 percent porosity to about 40 percent porosity. This high level of porosity directly affects the abradability of the alumina. As alumina becomes more porous, it becomes weaker and more abradable. Generally, the alumina of the present invention is an abradable material. Very dense alumina is very abrasive, being used in applications such as grinding wheels, while porous alumina is very abradable. Since the porous alumina is abradable, rather than abrasive, the porous alumina will not wear away blade tips as severely or as rapidly as dense alumina. Second, the alumina is thermodynamically stable at the temperature ranges in which jet aircraft engines operate, which means that the alumina will not react in the high temperature environment of a turbine with either the hot gases or the underlying substrate.

In addition to the properties of abradability, the alumina will also offer some thermal protection to the substrate to which it is applied. Alumina is a poor conductor of heat and therefore protects the substrate from the hot gases flowing through the jet aircraft engine. This thermal protection will increase the length of time that the substrate will be able to be kept in service without the need for a shop visit. The shroud is easily repaired and requires no special processing beyond the processing set forth in FIG. 1. If desired, air cooling can be added to the stator, so the continuous nature of the porosity after removal of the aluminum provides an effective flow path for cooling air.

The application of the alumina wear coating is not limited to aircraft engine shrouds. Many metallic aircraft engine components will benefit from the application of the alumina wear coating. The alumina will work particularly well with cobalt-based, nickel-based, iron-based superalloy substrates, or combinations thereof In addition to stator shrouds, one aircraft engine component that will benefit from the alumina wear material is a labyrinth seal, where the ceramic wear coating is applied to the abradable surface of the labyrinth seal at the interface between the labyrinth teeth and the labyrinth abradable seal area. In a preferred embodiment, the thickness of the alumina wear material will be greater than the expected interference from other aircraft engine components due to thermal expansion and normal maneuver loads.

Figure 2:
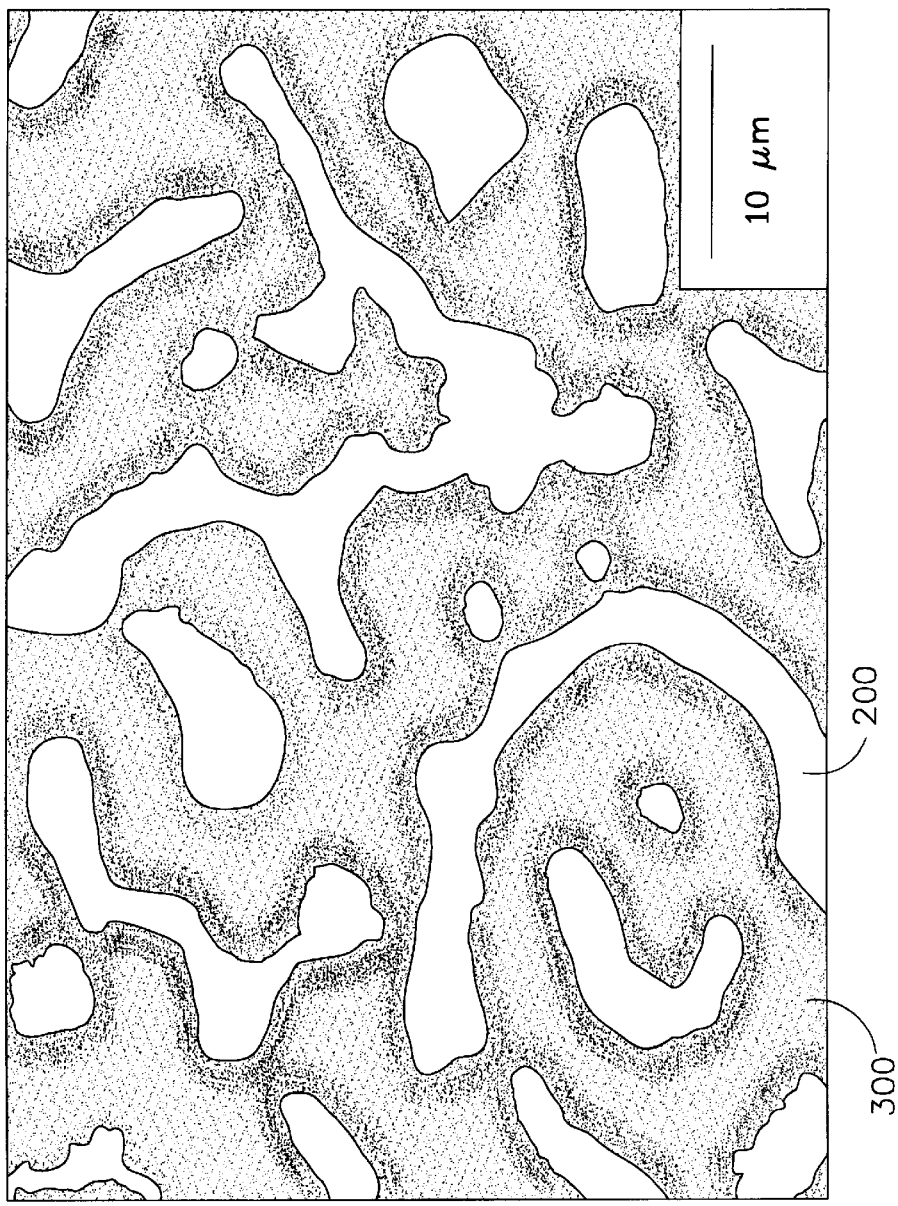
FIG. 2 is a magnified view of the surface features of the alumina material, which illustrates the size and form of the interconnected features on the surface of the material.

FIG. 2 is an enlarged depiction showing the features of the alumina structure on the surface of a metal substrate (not shown). The line in the bottom right corner of the depiction shows a scale having a length of 10 μm and illustrates the approximate scale of the structure. The light phase represents the metallic phase 200 in the reacted composite structure and the dark phase represents alumina 300. The light phase is leached out and becomes the porosity of the present invention.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A labyrinth tooth seal aircraft engine component having an alumina wear coating applied to a surface of the labyrinth seal at an interface between labyrinth teeth and an abradable labyrinth seal area, said alumina wear coating material characterized by:

porosity in the range of about 20 percent to about 45 percent; and a substantially continuous globular surface with features having sizes in the range of about 0.5 to about 20 microns.

2. The labyrinth tooth seal of claim 1, wherein the alumina wear coating material has porosity in the range of about 30 percent to about 40 percent.

3. A labyrinth tooth seal aircraft engine component comprising a superalloy selected from the group consisting of cobalt-based superalloy, nickel-based superalloy, iron-based superalloy, and combinations thereof, said labyrinth tooth seal having an alumina wear coating applied to a surface of the labyrinth seal at an interface between labyrinth teeth and an abradable labyrinth seal area, said alumina wear coating material characterized by:

porosity in the range of about 20 percent to about 45 percent; and a substantially continuous globular surface with features having sizes in the range of about 0.5 to about 20 microns.

4. The labyrinth tooth seal of claim 3, wherein the alumina wear coating material has porosity in the range of about 30 percent to about 40 percent.

* * * * *